United States Patent
Wicks

(10) Patent No.: US 10,801,448 B2
(45) Date of Patent: Oct. 13, 2020

(54) INTEGRAL INTAKE MANIFOLD

(71) Applicant: FORD GLOBAL TECHNOLOGIES, LLC, Dearborn, MI (US)

(72) Inventor: Christopher Donald Wicks, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 15/871,295

(22) Filed: Jan. 15, 2018

(65) Prior Publication Data

US 2019/0219009 A1 Jul. 18, 2019

(51) Int. Cl.
| | |
|---|---|
| F02M 35/10 | (2006.01) |
| B29C 64/10 | (2017.01) |
| F02M 35/112 | (2006.01) |
| B33Y 10/00 | (2015.01) |
| F02M 35/116 | (2006.01) |
| B33Y 80/00 | (2015.01) |

(52) U.S. Cl.
CPC ....... *F02M 35/10052* (2013.01); *B29C 64/10* (2017.08); *F02M 35/10045* (2013.01); *F02M 35/10065* (2013.01); *F02M 35/10118* (2013.01); *F02M 35/112* (2013.01); *F02M 35/116* (2013.01); *B33Y 10/00* (2014.12); *B33Y 80/00* (2014.12)

(58) Field of Classification Search
CPC ............. B29C 64/10; F02M 35/10045; F02M 35/116; F02M 35/112
See application file for complete search history.

(56) References Cited

U.S. PATENT DOCUMENTS

| | | | |
|---|---|---|---|
| 4,214,561 A | 7/1980 | Matsumoto et al. | |
| 4,327,675 A * | 5/1982 | Takeda | F02M 51/0675 123/470 |
| 4,348,997 A * | 9/1982 | Takeda | F02M 69/042 123/445 |
| 4,378,000 A * | 3/1983 | Moriya | F02M 69/043 123/442 |
| 4,741,295 A * | 5/1988 | Hosoya | F02M 35/10032 123/184.31 |
| 4,805,564 A * | 2/1989 | Hudson, Jr. | F02M 35/10118 123/184.42 |
| 4,811,697 A | 3/1989 | Kurahashi | |
| 5,273,010 A | 12/1993 | Elder | |

(Continued)

OTHER PUBLICATIONS ("For the Automakers, Large-Scale 3D Printing Is The Next Powerful Toolbox," Forbes, Jim Resnick, Mar. 8, 2017, https://www.forbes.com/sites/jimresnick/2017/03/08/for-the-automakers-large-scale-3d-printing-is-the-next-powerful-toolbox/#4d0cd2347ee0 (Year: 2017).*

(Continued)

*Primary Examiner* — Kevin A Lathers
(74) *Attorney, Agent, or Firm* — Geoffrey Brumbaugh; Brooks Kushman P.C.

(57) ABSTRACT

An engine component includes an intake manifold of stratified layers defining a plurality of runners each having a gas outlet leading to a cylinder head, and a plenum including partial walls forming channels radiating from a common gas inlet extending into a gooseneck conduit having an incorporated throttle body. The gooseneck conduit transitions into the channels and runners such that there is no seal between the gooseneck, plenum, and runners.

15 Claims, 8 Drawing Sheets

(56) References Cited

U.S. PATENT DOCUMENTS

| | | |
|---|---|---|
| 5,448,982 A | 9/1995 | Arakawa et al. |
| 5,538,571 A | 7/1996 | Miyajima |
| 5,851,456 A | 12/1998 | Mukawa et al. |
| 6,173,701 B1 | 1/2001 | Azuma |
| 6,189,521 B1 | 2/2001 | Hancock |
| 6,450,393 B1 | 9/2002 | Doumanidis et al. |
| 6,945,237 B1 | 9/2005 | Sullivan et al. |
| 6,966,310 B2 | 11/2005 | Moren |
| 7,055,499 B1 | 6/2006 | Kuwano et al. |
| 7,086,365 B1 | 8/2006 | Teeter |
| 7,305,958 B2 | 12/2007 | Doko et al. |
| 7,624,722 B2 | 12/2009 | Matthews |
| 8,205,604 B2 | 6/2012 | Velosa et al. |
| 8,800,524 B2 | 8/2014 | Groleau et al. |
| 9,004,036 B2 | 4/2015 | Clarke et al. |
| 9,574,528 B2 | 2/2017 | Hartzler et al. |
| 2004/0154574 A1 | 8/2004 | Menin |
| 2005/0235941 A1 | 10/2005 | Gessner et al. |
| 2007/0017490 A1 | 1/2007 | Sasaki et al. |
| 2010/0236513 A1 | 9/2010 | Lohr |
| 2013/0055713 A1 | 3/2013 | Drangel et al. |
| 2014/0216387 A1 | 8/2014 | Kulkarni |
| 2015/0020781 A1* | 1/2015 | Keating ........... F02M 35/10222 123/568.11 |
| 2017/0152777 A1 | 6/2017 | Kashiwabara et al. |
| 2018/0179999 A1* | 6/2018 | Yoshioka ......... F02M 35/10222 |

OTHER PUBLICATIONS https://3dprintingindustry.com/news/deltawings-racing-engine-is-powered-by-3d-printing-45624/ pdf accessed on Jul. 19, 2019. Archived on archiver.org from Nov. 12, 2016. Published by 3D Printing Industry, author Andrew Wheeler (Year: 2016).

American Heritage Dictionary Entry_stratify.pdf. Accessed on Jul. 22, 2019. https://ahdictionary.com/word/search.html?q=stratify (Year: 2019).

American Heritage Dictionary Entry_flange.pdf. Accessed on Jul. 24, 2019. https://ahdictionary.com/word/search.html?q=flange (Year: 2019).

* cited by examiner

INTEGRAL INTAKE MANIFOLD

TECHNICAL FIELD

Various embodiments relate to an integral intake manifold with an integrated throttle body and fuel injector for an internal combustion engine in a vehicle and a method of producing the same.

BACKGROUND

An intake or inlet manifold is a part of the engine that supplies the fuel/air mixture to the cylinders of the engine. The main function of the intake manifold is to evenly distribute the intake gasses to each intake port in the cylinder heads as even distribution optimizes the efficiency and performance of the engine. The design and geometry of the intake manifold influence the gas flow, turbulence, pressure drops, and other air flow phenomena inside the intake manifold.

SUMMARY

According to an embodiment, an engine component is disclosed. The engine component includes an intake manifold of stratified layers. The intake manifold defines a plurality of runners each having a gas outlet leading to a cylinder head. The intake manifold further defines a plenum including partial walls forming channels sharing a common gas inlet that extends into a gooseneck conduit, having a throttle body incorporated therewith, such that the gooseneck conduit transitions into the channels and runners without a seal. The throttle body may include a shaft integrated into the gooseneck conduit and a valve configured to obstruct gas flow in the gooseneck conduit. The shaft may extend from a first side of the gooseneck conduit to a second side of the gooseneck conduit. The throttle body may be located adjacent to an opening located on an opposite side of the gooseneck conduit than the gas inlet. The throttle body may be incorporated entirely within the gooseneck conduit. The partial walls may form an endoskeletal structure configured to support the intake manifold. The partial walls may protrude inward from opposing faces of the plenum. The partial walls may have a greater thickness than a remainder of the plenum.

In an alternative embodiment, an engine system is disclosed. The engine system may include a cylinder head and a layered material defining an intake manifold. The intake manifold has a plurality of runners each including a gas outlet communicating with the cylinder head. The intake manifold further has a plurality of runners each including a gas outlet communicating with the cylinder head. The fuel injector may include a tube tapering from a first end into a nozzle portion at a second end. The gooseneck conduit may include a portion of increased thickness arranged as a support for the fuel injector, the support extending outward from an outer layer of the gooseneck conduit. The fuel injector may extend from a gooseneck conduit exterior to a gooseneck conduit interior. The nozzle portion may protrude from an exterior of the gooseneck conduit into an interior of the gooseneck conduit in close proximity to an opening of the gooseneck conduit. The nozzle portion may include a tip having a plurality of apertures to spray gas into the gooseneck conduit. The engine system may further include a throttle body located in a cavity of the gooseneck conduit. The throttle body and the fuel injector may be adjacent to each other such that the nozzle portion is configured to eject fuel towards a valve of the throttle body to prevent gas from entering the gooseneck conduit.

In a yet alternative embodiment, a method of forming, by additive manufacturing, layers of materials defining an internal combustion engine intake manifold is disclosed. The intake manifold has a plurality of runners each including a gas outlet leading to a cylinder head, and a plenum including partial walls that form channels sharing a common gas inlet that extends outwardly into a gooseneck conduit having a fuel injector, a throttle body, or both incorporated therewith, the gooseneck conduit transitioning into the channels and runners such that there is no seal between the gooseneck conduit, plenum, and runners, and the partial walls forming endoskeletal structure configured to support the intake manifold. The method may further include forming a support for the fuel injector in an outer layer of the gooseneck conduit. The forming may include shaping the fuel injector as a tube partially located in the gooseneck conduit exterior and protruding into an interior of the gooseneck conduit. The forming may include shaping the fuel injector as a tube partially located in the gooseneck conduit exterior and protruding into an interior of the gooseneck conduit. The forming may include forming a fuel injector tip including a plurality of apertures.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Figure 1:
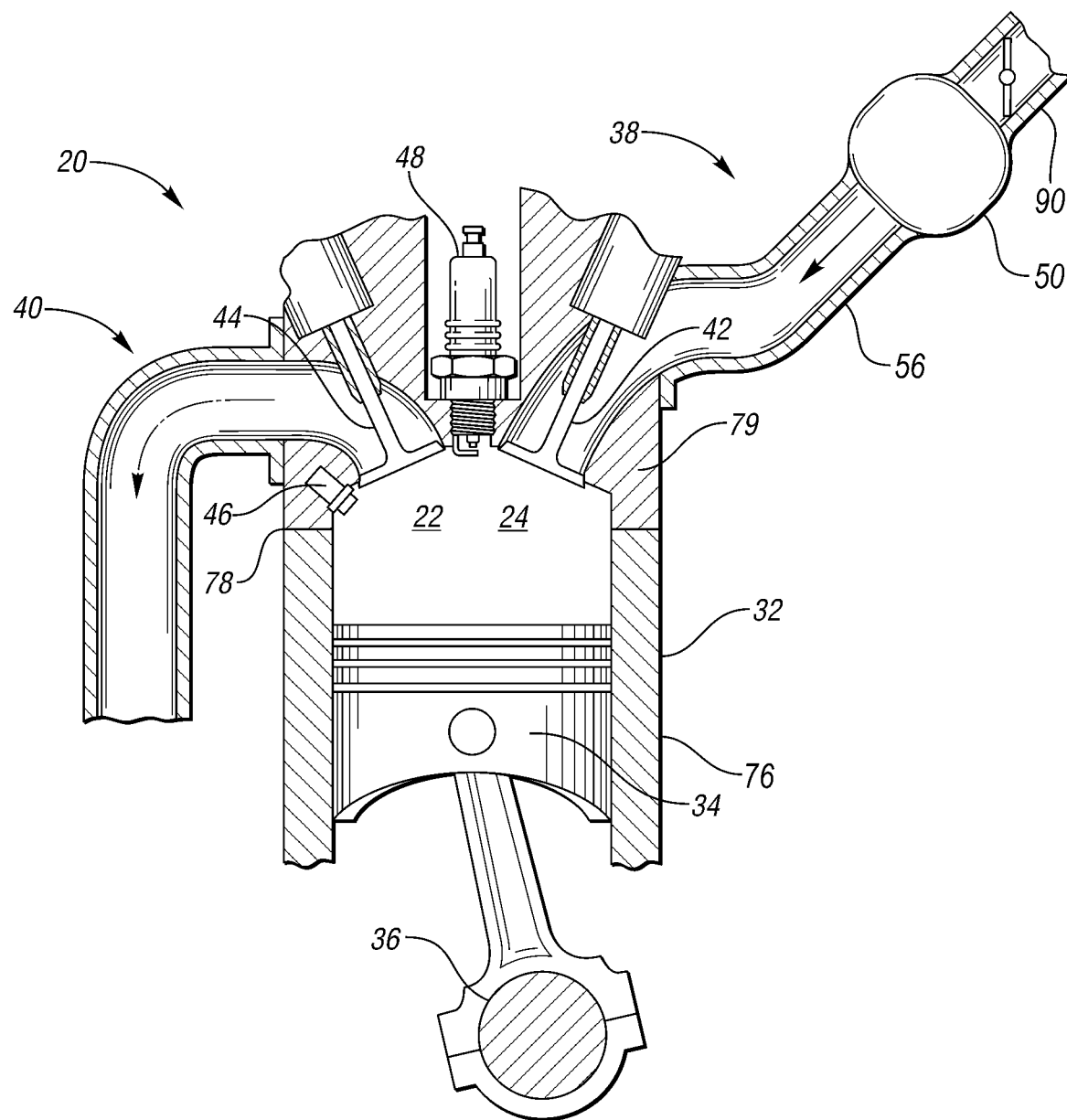
FIG. 1 illustrates a schematic of a non-limiting example of an internal combustion engine capable of employing various embodiments of the present disclosure.

Geometry, orientation, and design of an intake manifold has direct impact on the internal combustion engine efficiency. FIG. 1 illustrates a schematic non-limiting example of an internal combustion engine 20. The engine 20 has a plurality of cylinders 22, one of which is illustrated. The engine 20 may have any number of cylinders 22, including three, four, six, eight, or another number. The cylinders may be positioned in various configurations in the engine, for example, as a V-engine, an inline engine, or another arrangement.

The example engine 20 has a combustion chamber 24 associated with each cylinder 22. The cylinder 22 is formed by cylinder walls 32 and piston 34. The piston 34 is connected to a crankshaft 36. The combustion chamber 24 is in fluid communication with an example intake manifold 38 and the exhaust manifold 40. An intake valve 42 controls flow from the intake manifold 38 into the combustion chamber 24. An exhaust valve 44 controls flow from the combustion chamber 24 to the exhaust manifold 40. The intake and exhaust valves 42, 44 may be operated in various ways as is known in the art to control the engine operation.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 may be used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two-stroke cycle. During the intake stroke, the intake valve 42 opens and the exhaust valve 44 closes while the piston 34 moves from the top of the cylinder 22 to the bottom of the cylinder 22 to introduce air from the intake manifold 38 to the combustion chamber 24. The piston 34 position at the top of the cylinder 22 is generally known as top dead center (TDC). The piston 34 position at the bottom of the cylinder 22 is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The engine 20 includes a cooling system to remove heat from the engine 20, and may be integrated into the engine 20 as a cooling jacket containing water or another coolant.

A head gasket 78 may be interposed between the cylinder block 76 and the cylinder head 79 to seal the cylinders 22.

The depicted non-limiting example intake manifold 38 leading to the engine 20 includes a plenum housing 50 distributing intake gases to runners 56. The runners 56 provide the intake gases, including ambient air, exhaust gases from exhaust gas recirculation, the like, or a combination thereof, to the intake valves 42. A throttle valve 90 is provided to control the flow of intake gases to the plenum housing 50. The throttle valve 90 may be connected to an electronic throttle body for electronic control of the valve position. The intake manifold 38 may be connected to an exhaust gas recirculation (EGR) system, a canister purge valve (CPV) and fuel system, a positive crankcase ventilation (PCV) system, a brake booster system, the like, or a combination thereof. An air filter (not shown) may be provided upstream of the throttle valve 90.

Figure 2:
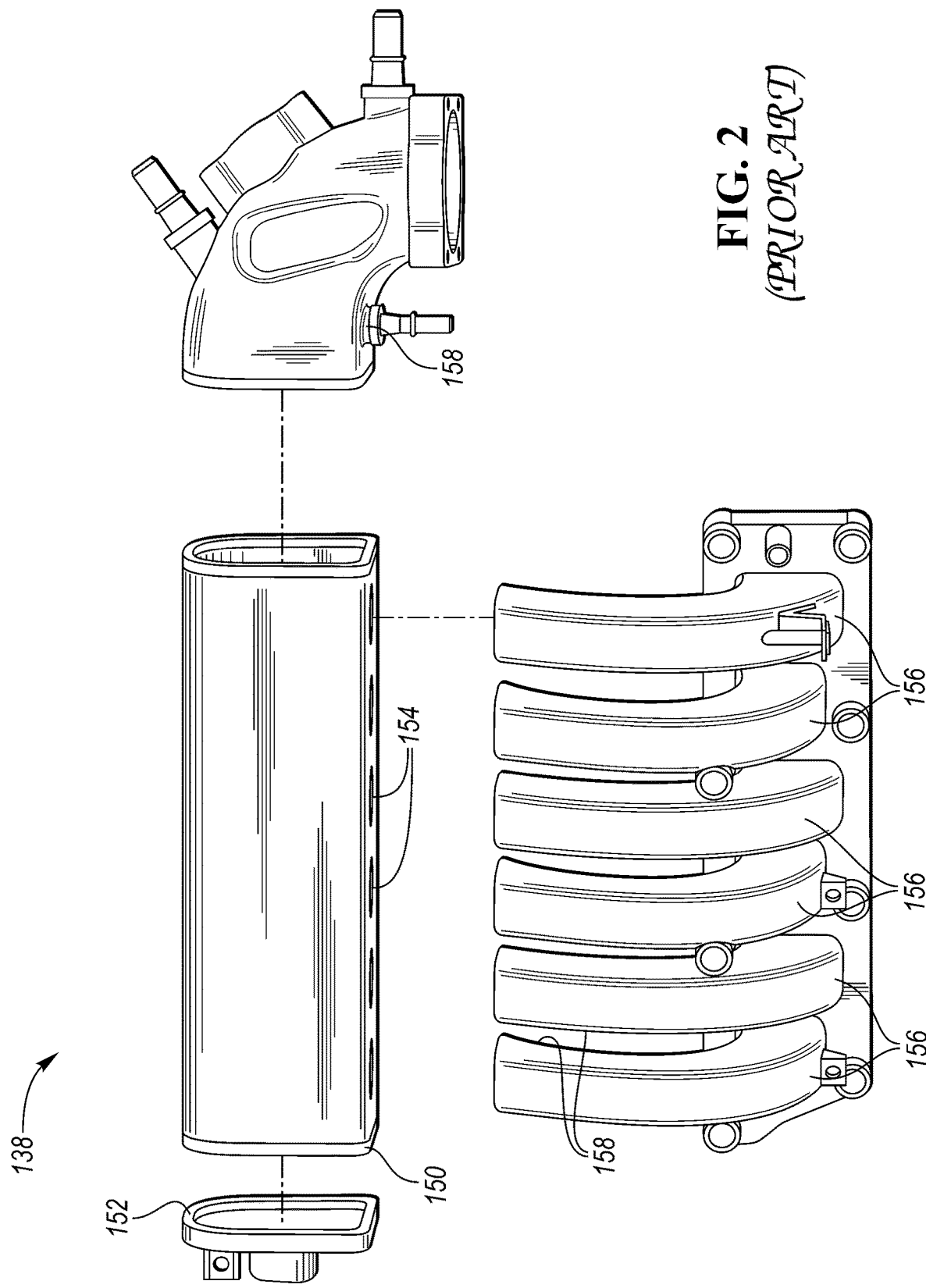
FIG. 2 illustrates an exploded view of an example prior art intake manifold.

Typically, as is shown in FIG. 2, an intake manifold 138 is manufactured in separate parts which are subsequently assembled together. For example, FIG. 2 shows an exploded view of an intake manifold system 138 according to an embodiment for use with the engine of FIG. 1. The intake manifold 138 is a modular system that allows for various separate components of the intake manifold to be positioned and assembled variably to form the manifold 138. The assembly requires manufacture of separate parts such that the intake manifold 138 may be assembled in multiple configurations based on the engine position and vehicle packaging considerations. The individual separate parts include the plenum body 150, the end plate 152 to enclose the interior volume of the plenum body 150, apertures 154 of the plenum body 150 to receive runners 156, and a throttle body connector 158.

Figure 3:
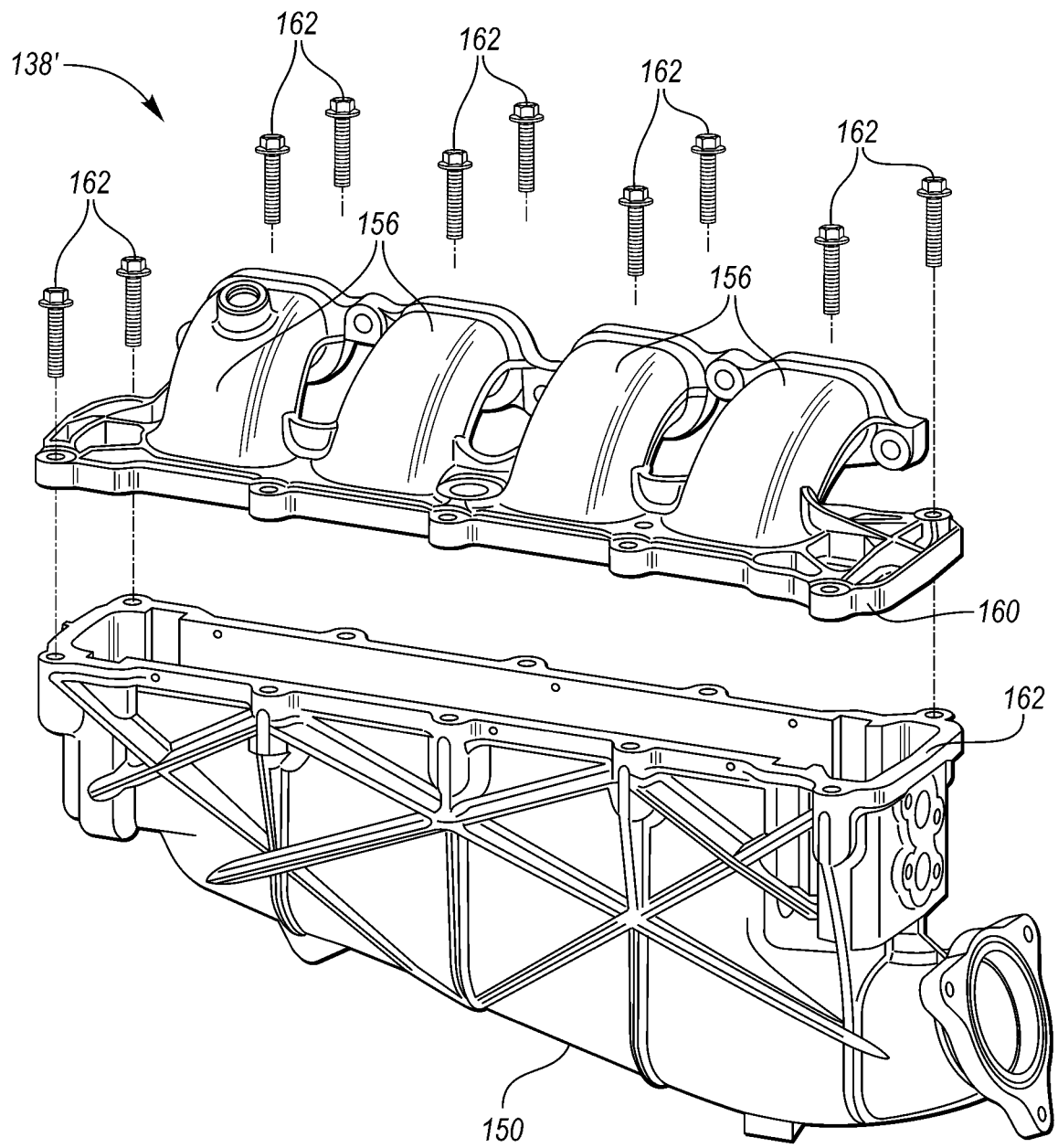
FIG. 3 illustrates an exploded view of an alternative prior art example intake manifold.

Yet, other intake manifolds with just one installation position within the engine, such as an intake manifold 138' depicted in FIG. 3, are typically manufactured in several pieces or parts and subsequently assembled and secured with fasteners, adhesives, welds, or a combination thereof. FIG. 3 depicts an intake manifold 138' having several discreet parts including a plenum 150 and a separate piece forming a plurality of runners 156 and a flange 160, attachable to a top end 162 of the plenum 150 with fasteners 162. To further strengthen the plenum 150, ribs 164 are typically added on the exterior portion of the plenum 150.

Yet, assembly of various parts to form a typical intake manifold is quite complex and time consuming. In the interest of increasing fuel efficiency, some of the parts may be made from light-weight materials such as composites and plastics. This may result in a number of connecting parts made from different materials which typically presents a challenge, especially if the bond is to be leak-proof. Assembly is time consuming and adds to cycle time. Moreover, anytime bonding of at least two components is required, necessary control checks are vital to ensure that the bond is provided correctly. Such checks are expensive and add to cycle time.

Furthermore, traditional manufacturing methods, and the need to assemble individual parts together, present limitations with respect to the shape of the individual parts which may be manufactured. Thus, overall efficiency of the intake manifold may be limited as the shape ideal from an air-flow perspective may not be practical to manufacture due to cost, assembly, and time perspective.

Thus, it would be desirable to provide an intake manifold with reduced complexity of manufacturing, improved efficiency, and reduced time and cost of the intake manifold production.

In one or more embodiments, an integral intake manifold 238 overcoming one or more disadvantages of the prior art listed above is disclosed. The integral intake manifold 238, depicted, for example, in FIG. 4, includes a plenum or plenum housing 250 having a gas inlet 264 gradually extending into a plurality of channels 256. The plenum 250 is hollow and provides an internal volume for the intake gases to be distributed via the channels 256 to the engine. The plenum 250 may be sized and shaped to be at a partial vacuum during engine operation. The intake gas(es) may include fuel, ambient air, EGR gas, or a combination thereof.

In one non-limiting example, the plenum 250 may include additional features such as a sensor mount for a sensor such as an intake gas temperature sensor, a pressure sensor, the like, or a combination thereof. The plenum 250 may include an attachment feature 252 for use in connecting or supporting the intake manifold 238 to the engine, the vehicle, or both. The attachment feature 252 may include a flange, an aperture, or the like such that the unitary intake manifold 238 may be secured to the engine, the vehicle, or both.

While in the prior art, the plenum is typically a "log" style plenum body having a width of the internal cavity and distance between the longest sides quite regular, the disclosed plenum 250 has a varying shape defined by a plurality of channels 256. The plenum 250 includes partial walls 272 that form the channels 256 radiating from the common gas inlet 264. The partial walls 272 form an endoskeletal structure configured to support the intake manifold 250. The partial walls 272 divide the channels 256 from one another. The partial walls 272 may protrude into the cavity of the plenum from the opposing faces of the plenum 250, but do span from one face of the plenum to the other face and do not connect the opposing faces of the plenum 250. Alternatively, the partial walls 272 may be formed on just one face of the plenum 250. The plenum 250 thus does not feature any ribs on the outside as the endoskeleton, formed by the partial walls 272, strengthens the plenum 250.

The partial walls 272 may have a greater thickness/height than the thickness of the remaining portions of the plenum 250. The partial walls 272 may have a varying height such that at least one partial walls extend further into the cavity of the plenum 250 than at least one other partial wall 272. Height of the partial walls 272 is discussed below. Alternatively, all the partial walls 272 may have the same height within the cavity of the plenum 250.

The channels 256, divided by the partial walls 272, may be shaped in various ways. For example, the channels 256 may be straight, curved, or both. The channels 256 may have various lengths, based on the engine design. The channels 256 may be tuned to take advantage of the Helmholtz resonance effect. Each channel 256 may be shaped differently, have different geometry, to maximize air flow into the engine. For example, at least one channel 256 may have different dimensions than the remaining channels 256. The dimensions may include length, angle of curvature, width. The dimensions may differ within the length of a channel 256. For example, the channel 256 may widen in the direction from the air inlet 264 towards an opening 254.

Figure 5:
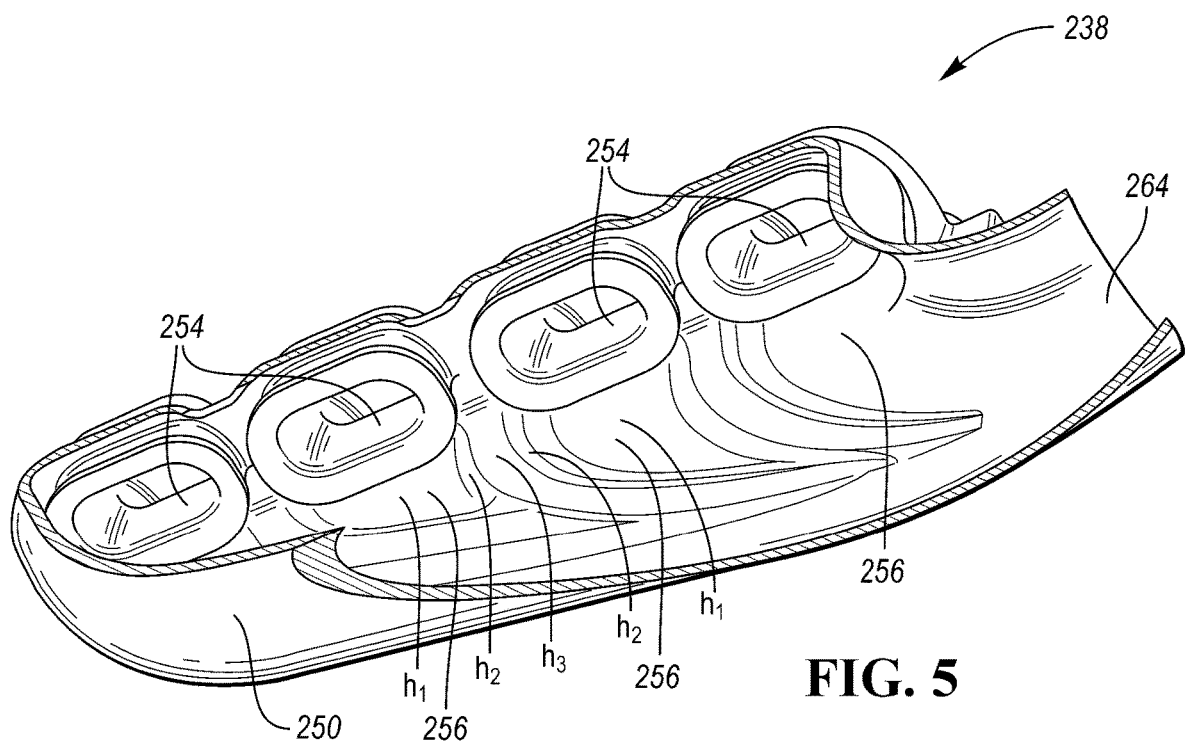
FIG. 5 shows a cross-sectional view of the unitary intake manifold of FIG. 4 along the line 5-5.
Figure 6:
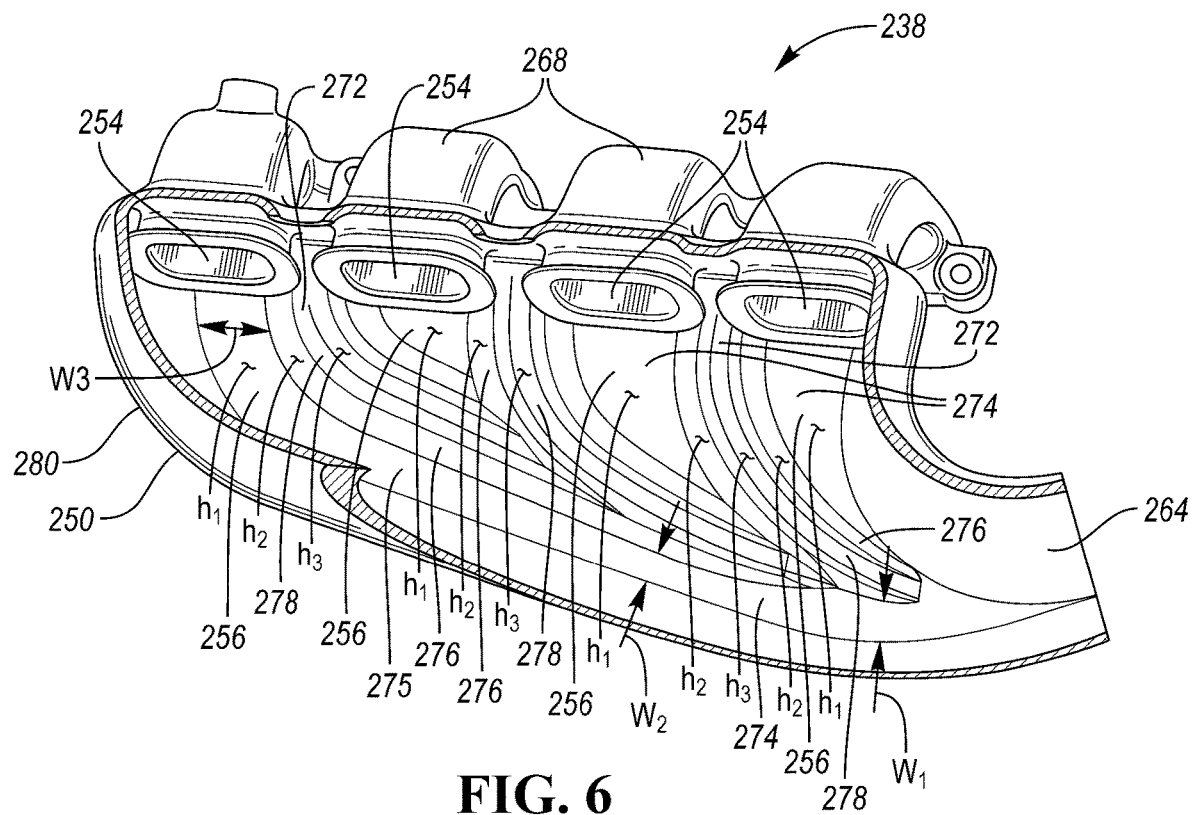
FIG. 6 shows an alternative cross-sectional view of the unitary intake manifold of FIG. 4 along the line 6-6.

As FIGS. 5 and 6 show, the gas inlet 264 forms a first end of the channels 256. The channels 256 have a second end 266 formed by an opening or aperture 254. The channels 256 may gradually transition into runners 268 via the opening 254. The channels 256 transition into the runners such that there is no seal between the plenum 250 and the runners 268.

The aperture 254 is positioned at the opposite end of each channel 256 than the gas inlet 264. The aperture 254 may be arranged perpendicular to the influx of intake gasses via the gas inlet 264. The opening 254 may be a bell mouth opening. The bell mouth opening 254 is a tapered opening where the taper may resemble a shape of a bell. The bell mouth opening 254 may be an expanding or reducing opening. The angle of the opening 254 may be tapered at about 30-60°, or at about 45°. The opening 254 gradually extends or leads into a plurality of runners 268. The transition from the channels 256 into the openings 254 and into the runners 268 may be smooth, without interruptions in airflow, a gradual transition of curvatures of the same material. The transition of the channels 256 to the opening may include a flange 282 and a notch 255, examples of which are depicted in FIG. 7.

Figure 7:
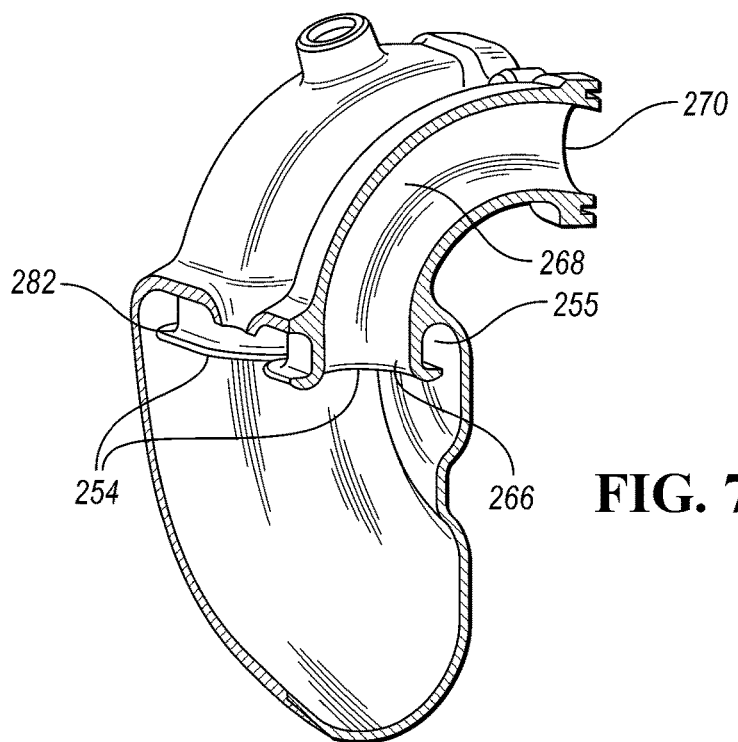
FIG. 7 show a yet an alternative cross-sectional view of the unitary intake manifold of FIG. 4 along the line 7-7.

The runners or ducts 268, cross-section of which is depicted in FIG. 7, form a convergent inlet airway directing the intake gas into the inlet of the engine or into an intake port of the cylinder head. The runners 268 may have the same or different dimensions, shape, or both. The runner 268 may have a circular, oval, or rectangular cross-section. The runner 268 may have the same cross-section as the opening 254. The runner 268 may get smaller as the gas flows into the engine via an outlet 270. The runner 268 may have uniform geometry, width, or both throughout its length. Incorporation of the bell mouth opening 254 leading to the runners 268 may increase efficiency of air flow via the intake manifold 238 to the engine.

The cross-sectional area of the bell mouth opening 254 may be larger than that of the runner 268. The cross-sectional area of the bell mouth opening 254 may be about double that of the runner 268 area. The cross-sectional area of the bell mouth opening 254 may be such that the air velocity entering the bell mouth opening is low to reduce noise, turbulence, pressure drop, and the like, and gradually increases to the desired design velocity of the runner 268.

The cross section of the opening 254 may be rectangular, square, circular, oval, or the like. The opening 254 may have a flange 282 around at least a portion of its circumference. The opening 254 may have the same, smaller, or larger diameter than the diameter of the gas inlet 264.

As can be further seen in FIG. 6 with respect to the channels 256, individual channels 256 are divided from one another. The division may be provided by one or more areas forming partial walls 272. The partial walls 272 may form raised portions extending towards the interior of the plenum 250, but not connecting opposing faces of the plenum 250. The partial walls 272 may form lateral portions of each channel 256. The height of the partial walls 272 may differ. The partial walls 272 may have peaks 278 forming the highest portions of the dividing areas 272.

The channels 256 thus contain the shallowest portion 274 having height $h_1$, the partial walls featuring a middle portion 276 having height $h_2$, and a peak 278 having height $h_3$. $h_1 > h_2 > h_3$. Additional raised portions of the partial walls 272 with additional heights different from $h_1$, $h_2$, $h_3$ are contemplated.

The shallowest portion 274 of each channel 256 may have a different shape and area than in the remaining channels 256. For example, the channel 256 leading to the opening 254 most distant from the air inlet 264 may include the shallowest portion 274 arranged as an expansion area 275. The expansion area 275 may be defined by a partial wall 272 between adjacent channels 256 and an outer side 280 of the plenum 250. Another expansion area may be included in a channel 256 adjacent to the gas inlet 264 defined by a partial wall 272 and an outer side of the plenum 280. The expansion area 275 may have a width which increases in the direction from the air inlet 264 towards the mouth opening 254. The expansion area 275 may expand the entire length between the air inlet 264 and the opening 254. The width of the expansion area 275 may differ throughout its length to accommodate the most optimized airflow patterns. The varying width of the expansion area allows for even distribution of the intake gas. For example, $w_3 > w_1 > w_2$.

In contrast to the expansion area 275 of the outer-most channel 256 and/or the channel adjacent to the gas inlet 264, the shallowest portion 274 of the remaining channels 256 may not extend from the gas inlet 264, but be confined within the middle portions 276 and peaks 278 of the partial walls 272. Thus, the inlet gasses entering the plenum 250 via the gas inlet 264 encounter predominantly the open expansion area 275. Specifically, the expansion area 275 in the channel 256 adjacent to the gas inlet 264 allows to direct gas into the channel 256 which is typically hard to supply gas with in the prior art designs. The purpose of this design thus allows even distribution of the intake gasses within the entire plenum 250 and intake manifold 238 such that the gasses flow from the gas inlet 264 via the channels 256 towards the opening 254, via the runners 268 and the outlet 270 evenly. Even distribution optimizes the efficiency and performance of the engine.

Figure 4:
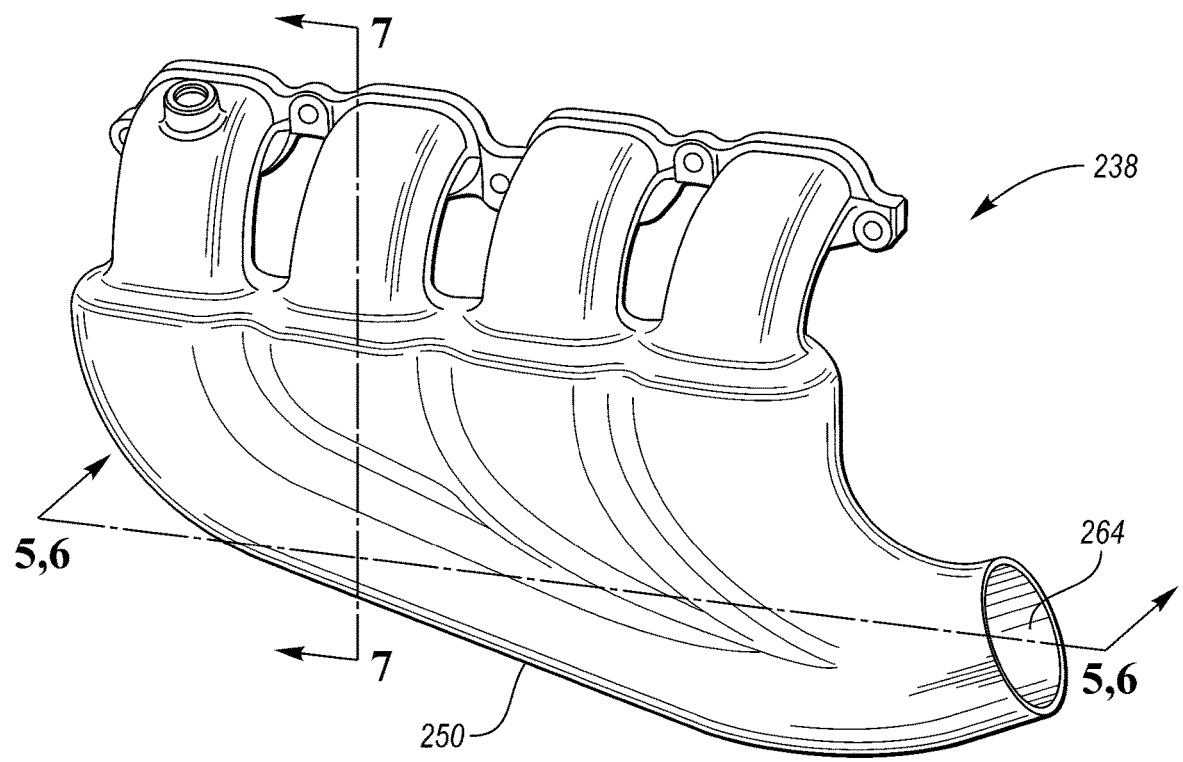
FIG. 4 illustrates a perspective view of a non-limiting example of a unitary intake manifold according to one or more embodiments.

As depicted in FIGS. 4-6, the intake manifold 238 is formed as a unitary, integral piece. The unitary piece includes the plenum 250 with the channels 256, gradually transitioning into runners 268. The unitary intake manifold 238 thus presents an article having a surface with smooth contours throughout the article, providing smooth transitions from the gas inlet 264 to the channel outlets 270, resulting in an even distribution of the intake gasses to the engine, optimal degree of turbulence supporting atomization, and minimizing pressure drops. Unitary means that the entire intake manifold 238 is formed as one piece such that the individually described portions mentioned above are formed as integral portions of the intake manifold 238 and not as separate parts, later assembled into an intake manifold. The unitary intake manifold 238 thus requires no seals. For example, there is no seal between the plenum 250 and the runners 268.

The inner surface of the unitary intake manifold 238 may be smooth, textured, rough, or a combination thereof. For example, at least one portion of the inner surface may be textured to induce a desired degree of turbulence within the intake manifold 238.

The wall thickness of the intake manifold may be reduced in comparison with the prior art intake manifolds. For example, while the typical intake manifold has a wall thickness of about 3.5 to 4.5 mm, and stiffening ribs on the exterior part of the plenum, the unitary intake manifold 238 disclosed herein may have a wall thickness of about 2 mm. Stiffening ribs are not necessary due to presence of the partial walls 272 configured to support the intake manifold 238.

Figure 8:
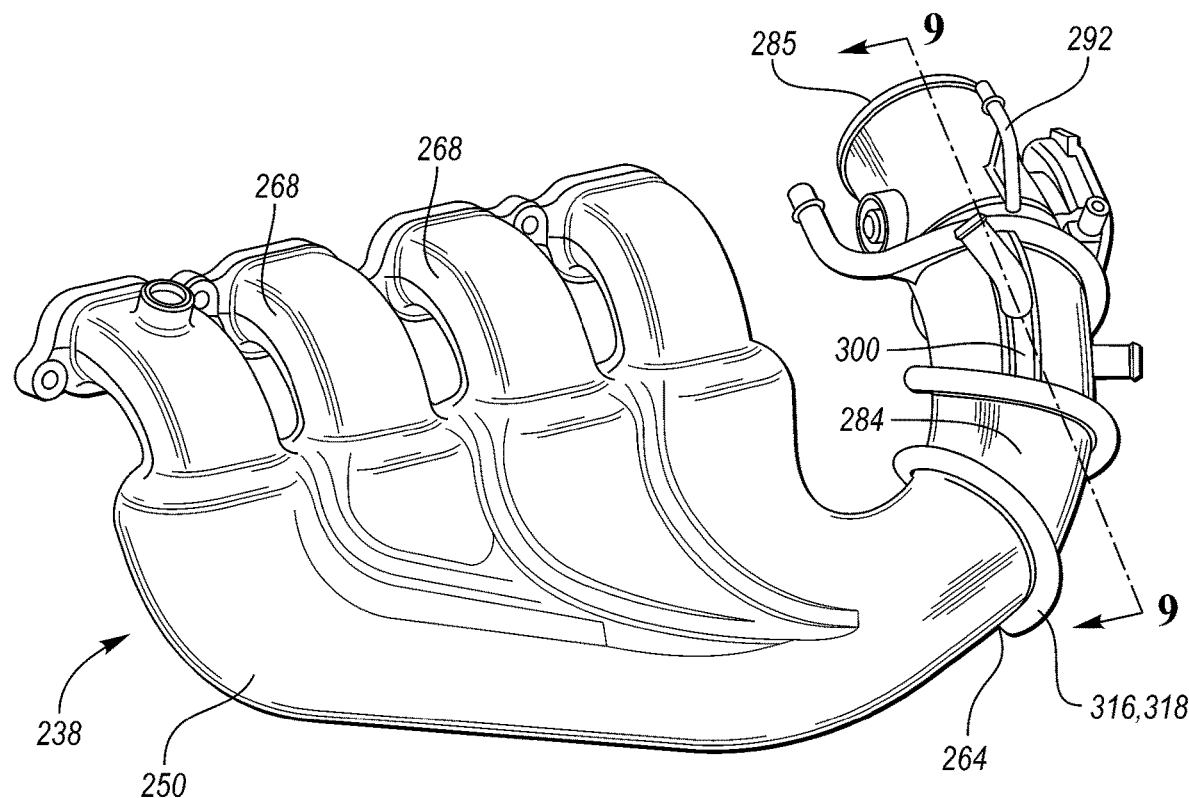
FIG. 8 shows an alternative embodiment of the unitary intake manifold including a non-limiting example of a gas inlet channel disclosed herein.

In another embodiment, depicted in FIG. 8, the unitary intake manifold 238 also includes a gas inlet channel, duct, or gooseneck conduit 284. The gooseneck conduit 284 extends outwardly from the gas inlet 264. The gooseneck conduit 284 gradually transitions into the channels 256 such that there is no seal between the plenum 250 and the gooseneck conduit 284.

The gooseneck conduit 284 may have the same diameter as the gas inlet 264. The gooseneck conduit 284 may extend, curve, or both from the plenum 250 in the same or similar general direction as the runners 268. The gooseneck conduit 284 may have uniform dimensions, geometry, or both throughout its length. The gooseneck conduit 284 may have a variety of shapes. For example, the gooseneck conduit 284 may be formed as a cylindrical tube. The gooseneck conduit 284 may form an elbow-shaped portion. The gooseneck conduit 284 may be straight or curved. The gooseneck conduit 284 may be hollow. The gooseneck conduit 284 may be partially perforated, perforated along its entire length, or free of perforations. The gooseneck conduit 284 may have protrusions, ridges, or other texture inside to guide gas flow in an optimal manner from a first end 285, defining a port, opening, or aperture, to the gas inlet 264 forming the second end. The gooseneck conduit 284 has an inner or interior portion and an exterior portion.

The gooseneck conduit 284 may also define various ports, mounts, sensors, apparatuses, or a combination thereof for connection to the engine, vehicle systems, or both. The gooseneck conduit 284 may have a greater or fewer number or ports or sensor connections than depicted in FIG. 8, and they may be arranged in various manners. For example, the gooseneck conduit 284 may have a brake booster port, an exhaust gas recirculation (EGR) apparatus, a connection port or mount for positive crankcase ventilation (PCV) apparatus, a connection port or mount for a canister purge valve (CPV) or system, a throttle body, the like, or a combination thereof. The arrangement of the ports, mounts, sensors, apparatuses, may be based on their size and packaging considerations, may be on the interior portion, exterior portion of the gooseneck conduit 284, or both.

Figure 9:
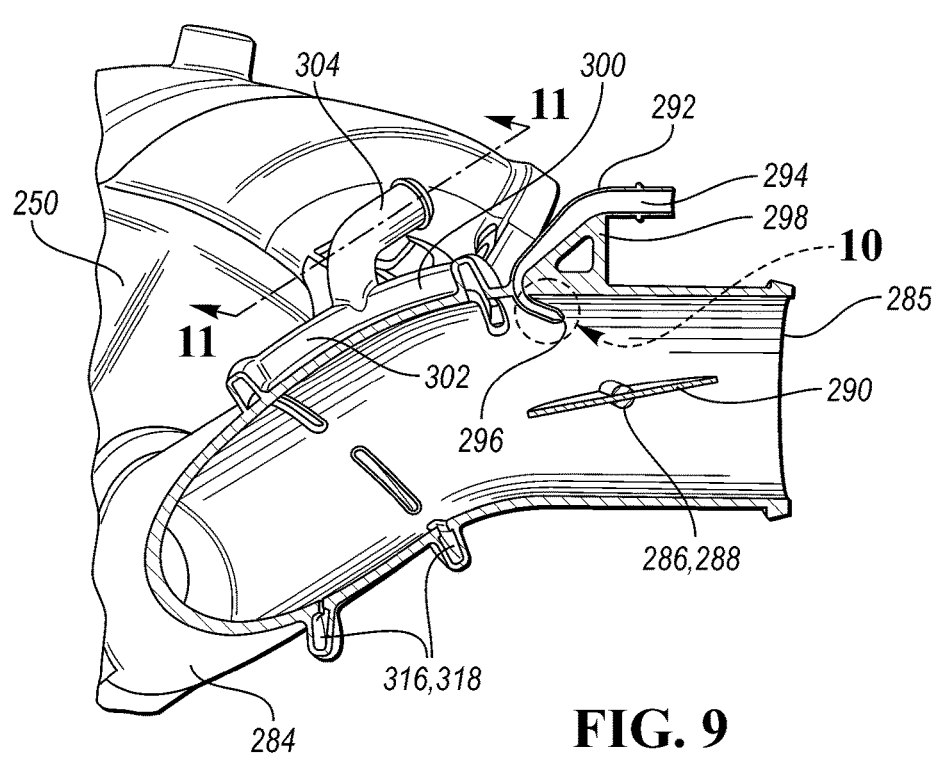
FIG. 9 illustrates a cross-section view of a portion of the gas inlet channel depicted in FIG. 8 along the line 9-9.

The gooseneck conduit 284 may form a throttle body connector. The gooseneck conduit 284 may thus form a member connecting a throttle body 286, a non-limiting example of which is depicted in FIG. 9, to the plenum 250. The gooseneck conduit 284 may thus provide a restriction and/or a flow channel for the intake gasses from the throttle body 286 to the plenum 250.

The throttle body 286 may be incorporated entirely within the gooseneck conduit 284. The throttle body 286 may include a shaft 288, a valve 290, an electronic throttle body, or a combination thereof. The shaft 288 may be integral to the unitary intake manifold 238 such that the shaft is formed as a portion of the intake manifold 238. The shaft 288 shaft extends from a first side of the gooseneck conduit 284 to a second side of the gooseneck conduit 284. Alternatively, an aperture housing the shaft 288 may be formed in the gooseneck conduit 284 to accommodate the shaft 288 and the blade or valve 290. The valve 290 may be a butterfly valve or a different type of a valve. The valve's shape and dimensions such as diameter match those of the gooseneck conduit 284.

The valve 290 may be configured to obstruct gas flow in the gooseneck conduit 284 when desirable. The valve 290 is movable on the shaft 288. The valve 290 is rotatable around the axis formed by the shaft 288. The valve 290 may be movable about the shaft 288 in such a way that the valve 290 may be oriented in a variety of positions.

In a first position, the valve 290 may be in a minimal contact with the sides of the gooseneck conduit 284. In the first position, the gooseneck conduit 284 is opened such that gas flow through the gooseneck conduit 284 is enabled. In the first position, the gas may freely flow from the first end 285 to the second end 264 of the gooseneck conduit 284. The first position defines a fully opened gooseneck conduit 284. In the first position, the gas flow is minimally restricted.

In a second position, the valve 290 is in contact with gooseneck conduit 284 around the circumference of the gooseneck conduit 284. In the second position, the gas flow is completely restricted such that the gas flow is minimized or non-existent, while the intake manifold 238 is being used.

The third position is any position between the first and second positions. During the third position, the valve 290 is in a partial contact with the sides of the gooseneck conduit 284, partially restricting gas flow via the gooseneck conduit 284.

The throttle body 286 may be located anywhere within the gooseneck conduit 284. For example, the throttle body 286 may be located between the first end 285 of the gooseneck conduit 284 and the gas inlet 264 of the plenum 250. The throttle body 286 may be located adjacent to the opening 285 located on an opposite side of the gooseneck conduit 284 than the gas inlet 264.

The throttle body 286 may be located upstream of the plenum 250, an EGR apparatus 316, a PCV apparatus 300, a fuel injector 292, the like, or a combination thereof. As can be seen in FIG. 9, it is desirable to arrange the throttle body 286 in the vicinity of a fuel injector 292.

The fuel injector 292 may include a tapering tube or duct 294 having a nozzle portion 296. The tube 294 may be tapering from a first end into the nozzle portion 296 at a second end. The fuel injector 292 extends from a gooseneck conduit exterior to the gooseneck conduit interior. The tapering duct 294, the nozzle 296, or both may protrude into the gooseneck conduit 284 via an aperture.

The tapering duct 294, the nozzle 296, or both may protrude into the gooseneck conduit 284 via an aperture. The fuel injector 292 may be arranged on a support portion 298 extending outward from the tubular portion of the gooseneck conduit 284 or from an outer layer of the gooseneck conduit 284. The support portion 298, the fuel injector 292, or both may form an integral part of the gooseneck conduit 284. The support portion 298 may have any shape or configuration. For example, the support 298 may be generally triangular. The support 298 may have a shape of the same or similar contours as the fuel injector duct 294. The support 298 may extend the entire or partial length of the fuel injector 292 portion(s) located on the exterior of the gooseneck conduit 284.

Figure 10:
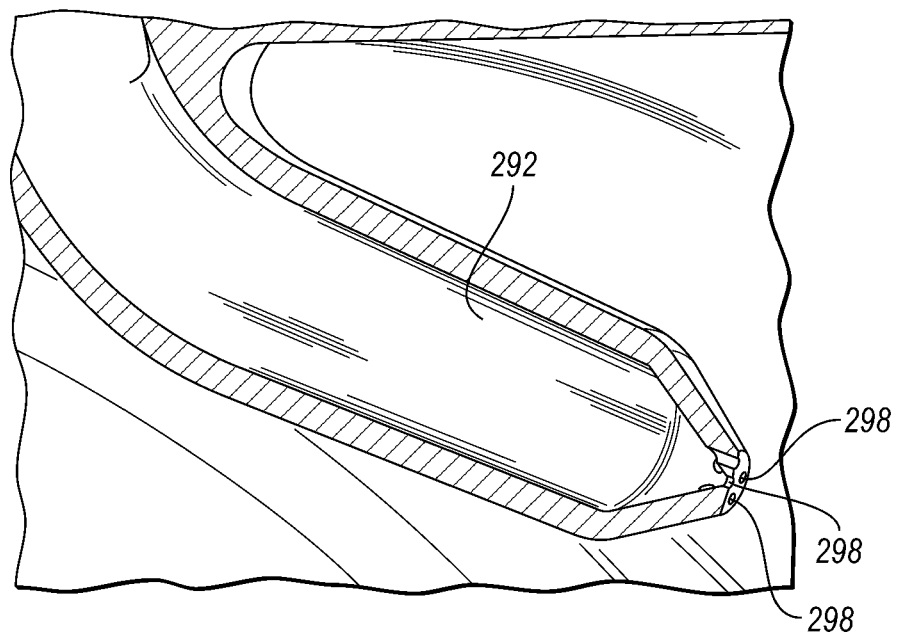
FIG. 10 shows a detailed view of a portion of the fuel injector depicted in FIG. 9.

The nozzle 296 may be configured to eject fuel into the gooseneck conduit 284. The nozzle 296 may be thus arranged to face the valve 290 of the throttle body 286. The fuel ejection may be provided via a tip having a plurality of apertures to spray gas into the gooseneck conduit 284. As can be further seen in FIG. 10, the nozzle portion 296 with its tip may include a number of openings 298 from which the fuel is injected. The openings 298 may have the same or different dimensions. The openings 298 may be arranged symmetrically or asymmetrically.

The nozzle 286 may be connected to one or more sensors assisting with fuel injection regulation. For example, one or more sensors may assist with co-ordination of the fuel injector 292 and the throttle body valve 290 such that the valve is 290 is oriented to obstruct gas flow when the fuel injector 292 is releasing fuel into the gooseneck conduit 284, the valve 290 may be in the second position.

As can be further seen in FIGS. 8 and 9, the gooseneck conduit 284 may house a PCV apparatus 300. A typical PCV system includes an inlet port located downstream from the throttle body. The inlet port is typically a single hole machined through a metallic or composite material of the intake manifold. The inlet port thus typically has sharp edges, where the machining breaks through to the air-path. When the system is actively pulling vacuum to vent the crankcase, all of the air flow is pulled from the single port. Yet, pulling air from the single, relatively small, concentrated source of air may cause disruption of the air flow in that particular area. To remedy this disruption, the PCV 300 is disclosed.

The PCV apparatus 300 may be located on the exterior portion of the gooseneck conduit 284. The PCV apparatus 300 may be extend from an outer layer of the gooseneck conduit 284 to the gooseneck conduit 284 exterior. The PCV apparatus 300 may include a housing 302, a channel 304 having a port 306, and a diverter 308. The housing 302 may be formed in the outer layer of the gooseneck conduit 284. The housing 302 may be shaped like a rectangle, square. The housing 302 may be elongated. The housing 302 may be hollow, including an interior section which is hollow. The housing 302 may include one or more openings, ports, apertures, or orifices 310. The orifices 310 protrude from the interior of the housing 302 into the interior portion of the gooseneck conduit 284. The orifices 310 may be angled, configured to supply gas to/from the crankcase while minimizing gas flow disturbance in the gooseneck conduit 284.

Figure 11:
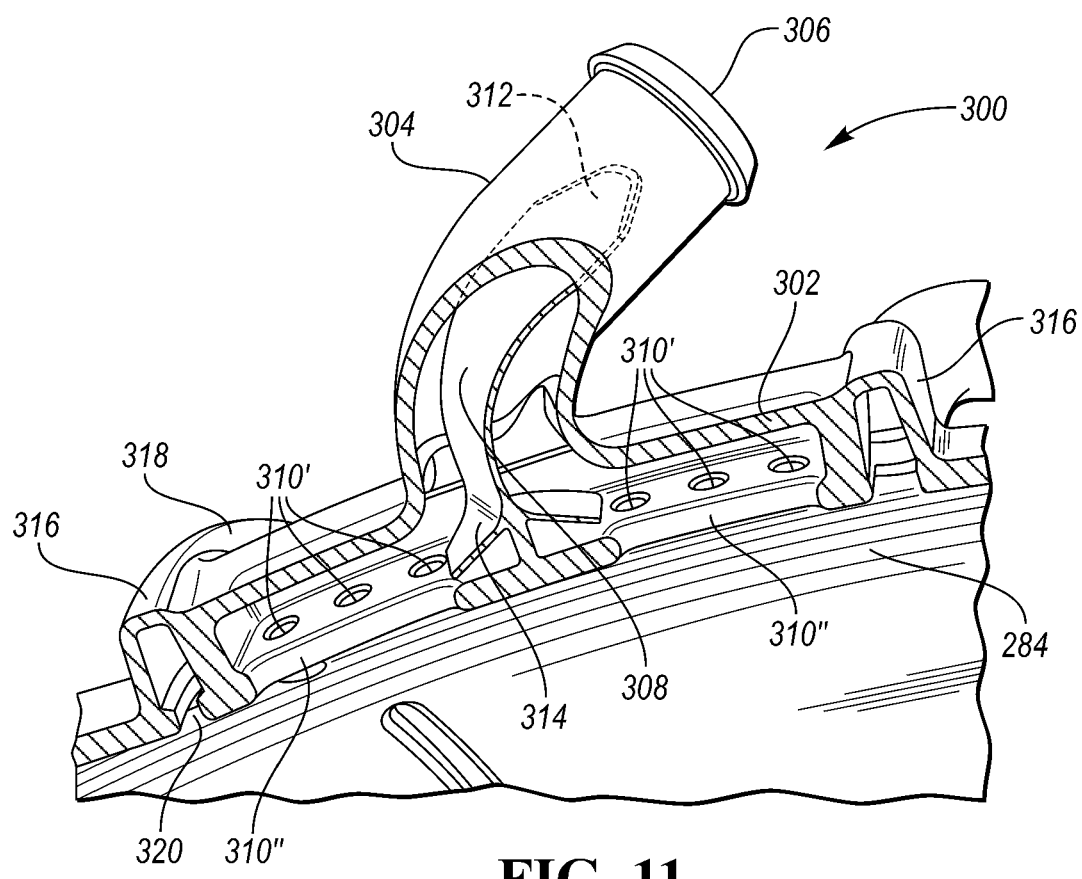
FIG. 11 shows a cross-section view of an example PCV apparatus depicted in FIG. 9 along the line 11-11.
Figure 12:
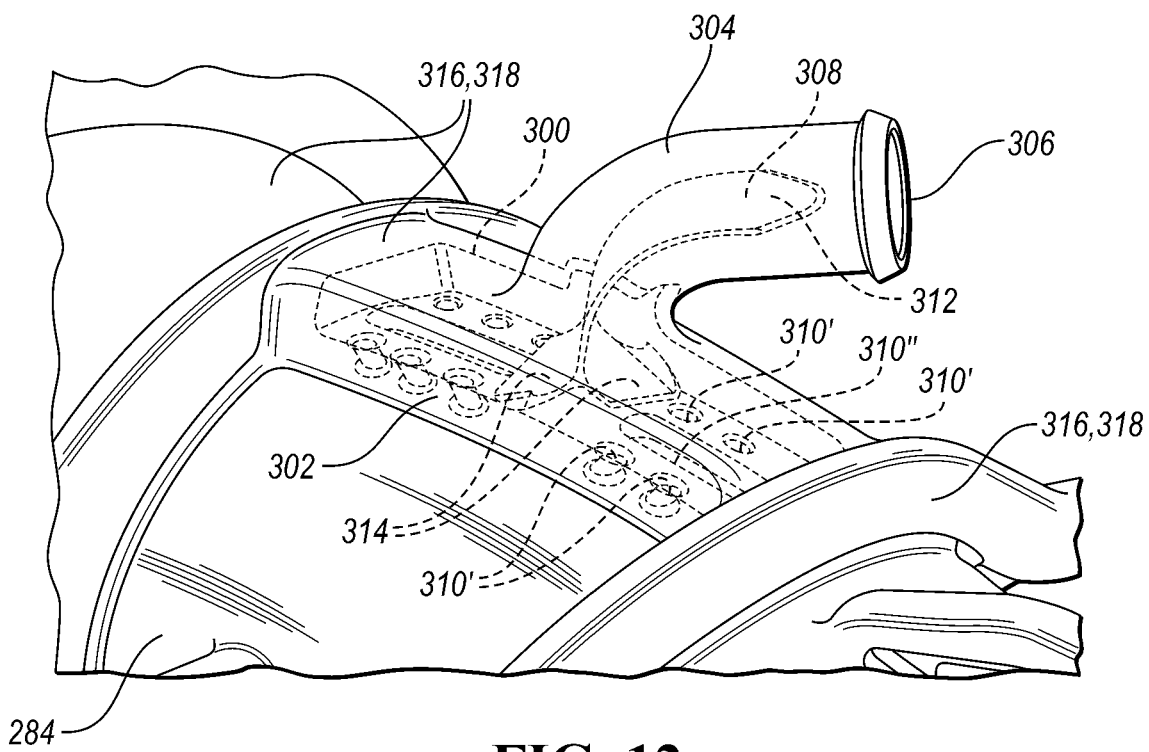
FIG. 12 shows an alternative view of the PCV apparatus.

The orifices 310 may be shaped and spaced apart in a symmetrical, asymmetrical, regular, or irregular fashion. The orifices 310 may have the same or different shape. For example, the orifices 310 may be circular, oval, elongated, square, rectangular, multi-angular. As FIGS. 11 and 12 show, the housing 302 may include a number of first orifices 310', having a circular cross-section, and another number of second orifices 310", configured as an elongated slot. Together, the orifices assist with optimal airflow.

To further assist with optimal air flow to/from the crankcase, while preventing disruption of the air flow in the gooseneck conduit 284, the PCV apparatus 300 includes a channel 304 having a port 306 and a diverter 308 located within the channel 304. The channel 304 may protrude from a central portion of the housing 302 and extend towards an air supply for the crankcase. The channel 304 may have a constant diameter. Alternatively, the channel 304 may be tapered. The channel includes 304 a port or an outlet aperture 306.

The PCV apparatus includes a diverter 308. The diverter 308 is located within the channel 304, extending towards the orifices 310 of the housing 302. Alternatively, the diverter 308 is arranged in the housing 302, extending into the channel 304 towards the port 306. The diverter 308 may have any shape. The diverter 308 may be a plate. The diverter 312 may be generally flat. The plate may be shaped like a tongue or a blade, having a first end 312 which is tapered and a second end forming a bifurcated end portion 314. The bifurcated end portion 314 may have dimensions equal, smaller, or greater than the diameter of the channel 304.

The PCV apparatus 300, or portions thereof such as the housing 302 and orifices 310, may be formed as integral parts of the intake manifold 238. The diverter 308 may be either formed as an integral part of the intake manifold 238 or formed separately and inserted within the channel 304.

In a yet alternative embodiment, the unitary intake manifold 238 may include an EGR apparatus 316. The EGR apparatus 316 serves as a nitrogen oxide reduction apparatus, capable of recirculating a portion of engine exhaust gas back to the engine cylinders. The gas flowing through the intake manifold 238 is enriched with gases inert to combustion, acting as absorbents of combustion heat, which reduces peak temperatures in the cylinders.

The typical EGR inlet port is located within the intake manifold inlet, downstream of the throttle body. The port, just like the PCV inlet port, is typically machined, leaving a port with sharp edges. Thus, when the EGR system is active, exhaust gas is introduced into the gas flow in the intake manifold through the port, which may cause disruption of the gas flow. Additionally, due to the single port, the mixing of the exhaust gas with the gas present inside of the gooseneck conduit 284 is minimal.

Figure 13:
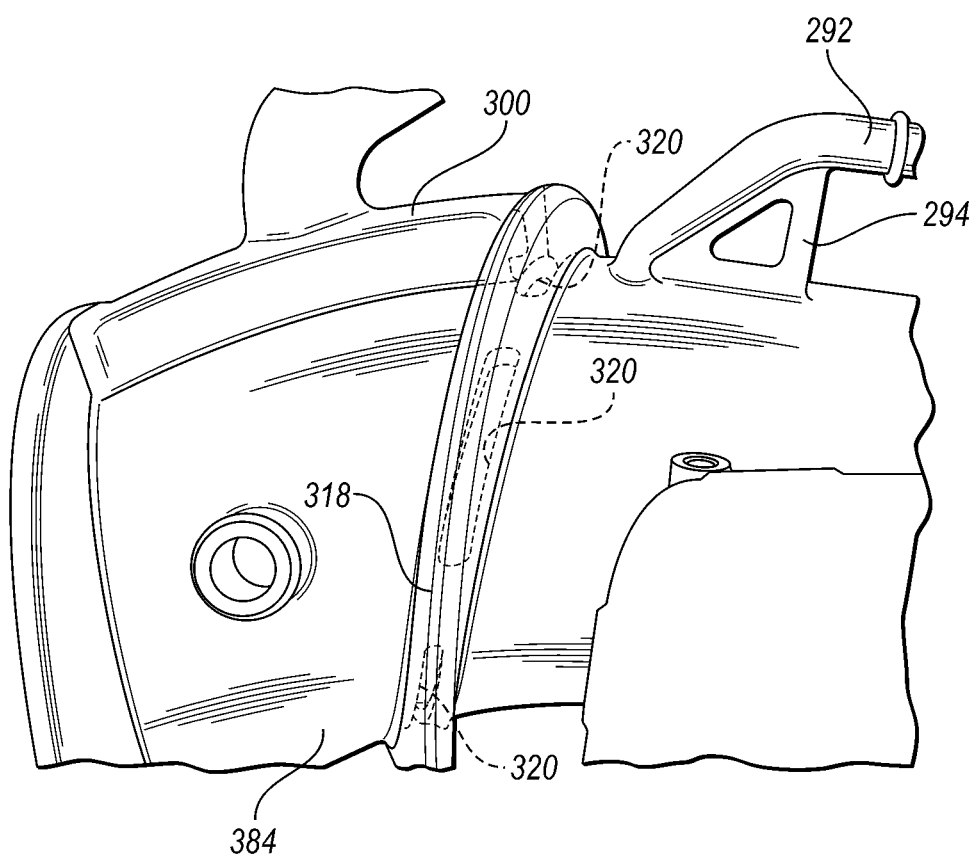
FIG. 13 shows a yet alternative view of the gas inlet channel with an example EGR apparatus.

To improve mixing of the exhaust gas with the gas present inside of the gooseneck conduit 284 as well as overall performance and engine efficiency, the EGR apparatus 316 is disclosed. The EGR apparatus 316, depicted in FIGS. 9, 11, and 13 includes a tube 318 adjacent to the exterior portion of the gooseneck conduit 284 and/or extending outward from an outer portion of the gooseneck conduit 284. The tube 318 has a helical shape. The tube 318 may have a different shape than a spiral. The tube 318 may have a generally circular, oval, rectangular, square, regular, or irregular cross-section. The tube 318 is hollow to allow flow of exhaust gas via the tube 318. The tube 318 may have a uniform or non-uniform diameter. The tube 318 may have uniform dimensions throughout its length. The tube 318 may wrap around a portion of the gooseneck conduit 284. The number of winds of the helix may be 1, 2, 3, 4 5, 6, 7, 8, 9, 10, or more.

The tube 318 includes one or more orifices 320 connecting the tube 318 to an interior portion of the gooseneck conduit 284. The orifices 320 may be elongated slots. Alternatively, or in addition, orifices 320 of different shapes may be present such as circular, square, oval, the like, or a combination thereof of orifices may be included. The orifices 320 may be distributed along the length of the tube 318 in a regular or irregular fashion. The orifices 320 allow dispersion of the exhaust gas along the length of the tube 318 such that the mixing of exhaust gas and gas present in the gooseneck conduit 284 is gradual and more efficient.

In at least one embodiment, the EGR apparatus 316 may be located adjacent to the PCV apparatus 300 or housing 302. Both the EGR apparatus 316 and the PCV apparatus 300 may be located downstream of the throttle body 286. The PCV apparatus 300 may be located adjacent to two coiled sections or winds of the EGR tube 318.

A method of forming the intake manifold 238 is also disclosed herein. The enabler for production of the disclosed intake manifold, having unique structural features depicted in the Figures and described above, may be additive manufacturing. Additive manufacturing processes relate to technologies that build 3-D objects by adding layer upon layer of material. The material may be plastic, metal, concrete, or the like. Additive manufacturing includes a number of technologies such as 3-D printing, rapid prototyping, direct manufacturing, layered manufacturing, additive fabrication, vat photopolymerization including stereolithography (SLA) and digital light processing (DLP), material jetting, binder jetting, material extrusion, powder bed fusion, sheet lamination, directed energy deposition, and the like.

Early additive manufacturing focused on pre-production visualization models, fabricating prototypes, and the like. The quality of the fabricated articles determines their use and vice versa. The early articles formed by additive manufacturing were generally not designed to withstand long-term use. The additive manufacturing equipment was also expensive, and the speed was a hindrance to a widespread use of additive manufacturing for high volume applications. But recently, additive manufacturing processes have become faster and less expensive. Additive manufacturing technologies have also improved regarding the quality of the fabricated articles.

Any additive manufacturing technique may be used to produce the disclosed intake manifold 238 as additive manufacturing technologies operate according to a similar principle. The method may include utilizing a computer, 3-D modeling software (Computer Aided Design or CAD), a machine capable of applying material to create the layered intake manifold, and the layering material. An example method may also include creating a virtual design of the intake manifold in a CAD file using a 3-D modeling program or with the use of a 3-D scanner which makes a 3-D digital copy of the intake manifold, for example from an already created intake manifold. The method may include slicing the digital file, with each slice containing data so that the intake manifold may be formed layer by layer. The method may include reading of every slice by a machine applying the layering material. The method may include adding successive layers of the layering material in liquid, powder, or sheet format, and forming the intake manifold while joining each layer with the next layer so that there are hardly any visually discernable signs of the discreetly applied layers. The layers form the three-dimensional solid intake manifold described above having a plenum housing with a gas inlet, the housing including a plurality of runners, each runner ending with an opening leading to a gas distribution channel having a gas outlet at its opposite end such that the additive manufacturing process forms a unitary integral piece. The method may also include forming additional features as integral parts of the intake manifold 238 by additive manufacturing, for example the EGR apparatus 316, the PCV apparatus 300, the fuel injector 292, the throttle body 286, the like, or at least one portion thereof. The material used may be metal, plastic, composite, the like, or a combination thereof.

The additively manufactured intake manifold 238 may need to undergo one or more post-processing steps to yield the final 3-D object, for example stabilizing. Stabilizing relates to adjusting, modifying, enhancing, altering, securing, maintaining, preserving, balancing, or changing of one or more properties of the intake manifold formed by additive manufacturing such that the formed intake manifold meets predetermined standards post-manufacturing.

The stabilized intake manifold remains in compliance with various standards for several hours, days, weeks, months, years, and/or decades after manufacturing. The property to be altered may relate to physical, chemical, optical, and/or mechanical properties. The properties may include dimensional stability, functionality, durability, wear-resistance, fade-resistance, chemical-resistance, water-resistance, ultra-violet (UV)-resistance, thermal resistance, memory retention, desired gloss, color, mechanical properties such as toughness, strength, flexibility, extension, the like, or a combination thereof.

Additive manufacturing enables formation of intricate shapes, undulating shapes, smooth contours and gradual transitions between adjacent segments or parts of the unitary intake manifold, resulting in a more even intake gas distribution to the engine. The intake manifold 238 formed by the method described above may be free of any fasteners, adhesive, or other types of bonds typical for traditional intake manifold manufacturing.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An intake manifold formed in a single unitary integral piece comprising:
   a plurality of runners each defining a gas flow outlet that supplies a gas to a cylinder head of an engine;
   a plenum including partial internal walls defining a plurality of channels each directing the gas to one of the runners;
   a gooseneck conduit providing gas from an inlet to the plenum; and
   a throttle body disposed in the gooseneck conduit and providing gas to the gooseneck conduit, wherein the throttle body comprises a shaft integrated into the gooseneck conduit and a valve configured to obstruct gas flow in the gooseneck conduit, wherein the shaft extends from a first side of the gooseneck conduit to a second side of the gooseneck conduit, and wherein the single unitary integral piece is formed as a series of stratified layers.

2. The intake manifold of claim 1, wherein the throttle body is located adjacent to an opening located on an opposite side of the gooseneck conduit than the gas inlet.

3. The intake manifold of claim 1, wherein the partial walls form an endoskeletal structure configured to support the intake manifold.

4. The intake manifold of claim 1, wherein the partial walls protrude inward from opposing faces of the plenum.

5. The intake manifold of claim 1, wherein the partial walls have a greater thickness than a remainder of the plenum.

6. An engine system comprising:
   a cylinder head;
   an intake manifold formed in a single unitary integral piece that includes—
      a plurality of runners each defining an outlet for gases supplied to the cylinder head, and
      a plenum including endoskeletal support structure forming channels that supplies the gases to the plurality of runners, and
   a gooseneck conduit receiving the gases from an inlet;
   a throttle body located within the gooseneck conduit; and
   a fuel injector assembled into the gooseneck conduit downstream of the throttle body, wherein the fuel injector comprises a tube tapering from a first end into a nozzle portion at a second end that is part of the single unitary integral piece, and wherein the throttle body is disposed in a cavity of the gooseneck conduit.

7. The engine system of claim 6, wherein the gooseneck conduit includes as a part of the single unitary integral piece a portion of increased thickness arranged as a support for the fuel injector, the support extending outward from an outer layer of the gooseneck conduit.

8. The engine system of claim 6, wherein the fuel injector extends from a gooseneck conduit exterior to a gooseneck conduit interior.

9. The engine system of claim 6, wherein the fuel injector protrudes from an exterior of the gooseneck conduit into an interior of the gooseneck conduit in close proximity to an opening of the gooseneck conduit.

10. The engine system of claim 6, wherein the nozzle portion comprises a tip having a plurality of apertures to spray gas into the gooseneck conduit.

11. The engine system of claim 6, wherein the throttle body and the fuel injector are adjacent to each other such that the nozzle portion is configured to eject fuel towards a valve of the throttle body to prevent the fuel from entering the gooseneck conduit.

12. A method of manufacturing an intake manifold for an engine comprising:
   forming, by additive manufacturing, layers of materials in a single unitary integral piece having—
      a plurality of runners each including a gas outlet leading to a cylinder head,
      a plenum including partial walls that form channels leading to the runners,
      a gooseneck conduit; and
   assembling a fuel injector into a throttle body defined by the gooseneck conduit that transitions into the channels and runners, wherein the single unitary integral piece has no seal between the gooseneck conduit, plenum, and the plurality of runners, and wherein the partial walls forming endoskeletal structure are configured to support the intake manifold.

13. The method of claim 12, wherein the forming step includes forming a support for the fuel injector in an outer layer of the gooseneck conduit.

14. The method of claim 12, wherein the forming step includes shaping the fuel injector as a tube partially located in the gooseneck conduit exterior and protruding into an interior of the gooseneck conduit.

15. The method of claim 12, wherein the forming step includes forming a fuel injector tip comprising a plurality of apertures.

* * * * *